United States Patent

[11] 3,617,721

[72] Inventor Jimmie L. Foster
     Granada Hills, Calif.
[21] Appl. No. 865,843
[22] Filed Oct. 13, 1969
[45] Patented Nov. 2, 1971
[73] Assignee Collins Radio Company
     Cedar Rapids, Iowa

[54] MACH COMPUTATION FROM ALTITUDE AND CALIBRATED AIRSPEED
11 Claims, 5 Drawing Figs.

[52] U.S. Cl. .................................................. 235/150.2,
                                           73/488, 324/160, 324/163
[51] Int. Cl. .................................................. G06g 7/78
[50] Field of Search .......................................... 235/150.2;
                                                       324/70 B; 73/488

[56] References Cited
UNITED STATES PATENTS
3,132,244  5/1964  Kemmer et al. ............... 235/150.2

OTHER REFERENCES
Hermann, P. J. et al., Basic Applications of Analog Computers, In Instruments and Automation, Vol. 29, p. 464, March 1956, Q184.I59.

*Primary Examiner*—Malcolm A. Morrison
*Assistant Examiner*—R. Stephen Dildine, Jr.
*Attorneys*—Richard W. Anderson and Robert J. Crawford ABSTRACT: Mach number, as defined in terms of barometric altitude and calibrated airspeed, is a complex nonlinear relationship. A method and means for deriving Mach number by linear analogue computation from altitude and airspeed is described. Selected linear techniques involving one or more straight line approximations reduce the computation to one or more linear functions and an ordinary dividing operation which may be readily implemented by electronic analogue computation.

INVENTOR.
JIMMIE L. FOSTER

MACH COMPUTATION FROM ALTITUDE AND CALIBRATED AIRSPEED

This invention relates generally to measurement techniques and more particularly to the definition of a method and means for calculating Mach number from readily available input parameters of barometric altitude and calibrated airspeed.

More particularly the present invention relates to a method and means for determining Mach number from application of selected linear techniques using one or more straight line functions of altitude and airspeed and an ordinary dividing operation.

Mach number may be conventionally computed by the use of complicated nonlinear techniques. Mach number may be defined as the ratio of the aircraft airspeed to the velocity of sound for the prevailing conditions of flight. The use of calibrated airspeed and altitude as input parameters for a computation of Mach leads to an extremely complex expression involving complex fractional powers of the input parameters. While the relationship between Mach, calibrated airspeed and barometric altitude may be readily derived, the relationship is extremely involved and electronic computation of Mach numbers from the relationship would be quite difficult. An object, therefore, of the present invention is to derive and implement a relationship defining Mach number in terms of calibrated airspeed and barometric altitude which may be implemented electronically as a relatively simple solution involving straight line functions of altitude and calibrated airspeed.

The present invention is accordingly featured in the derivation of a relationship between calibrated airspeed, barometric altitude, and Mach number based upon consideration of an empirical relationship between Mach number and the ratio of impact pressure to static pressure from which a normalization technique with respect to standard atmospheric pressure leads to an expression in the form of a simple quotient wherein both the numerator and denominator are essentially linear functions of calibrated airspeed and barometric altitude respectively. The basic relationship may be improved upon by application of linear techniques over the entire range of altitudes under consideration or further on the derivation of a plurality of linear relationships the collective implementation of which results in an improved readout accuracy over a desired altitude range.

These and other features and objects of the present invention will become apparent upon reading the following description with reference to the accompanying drawings in which.

Figure 4:
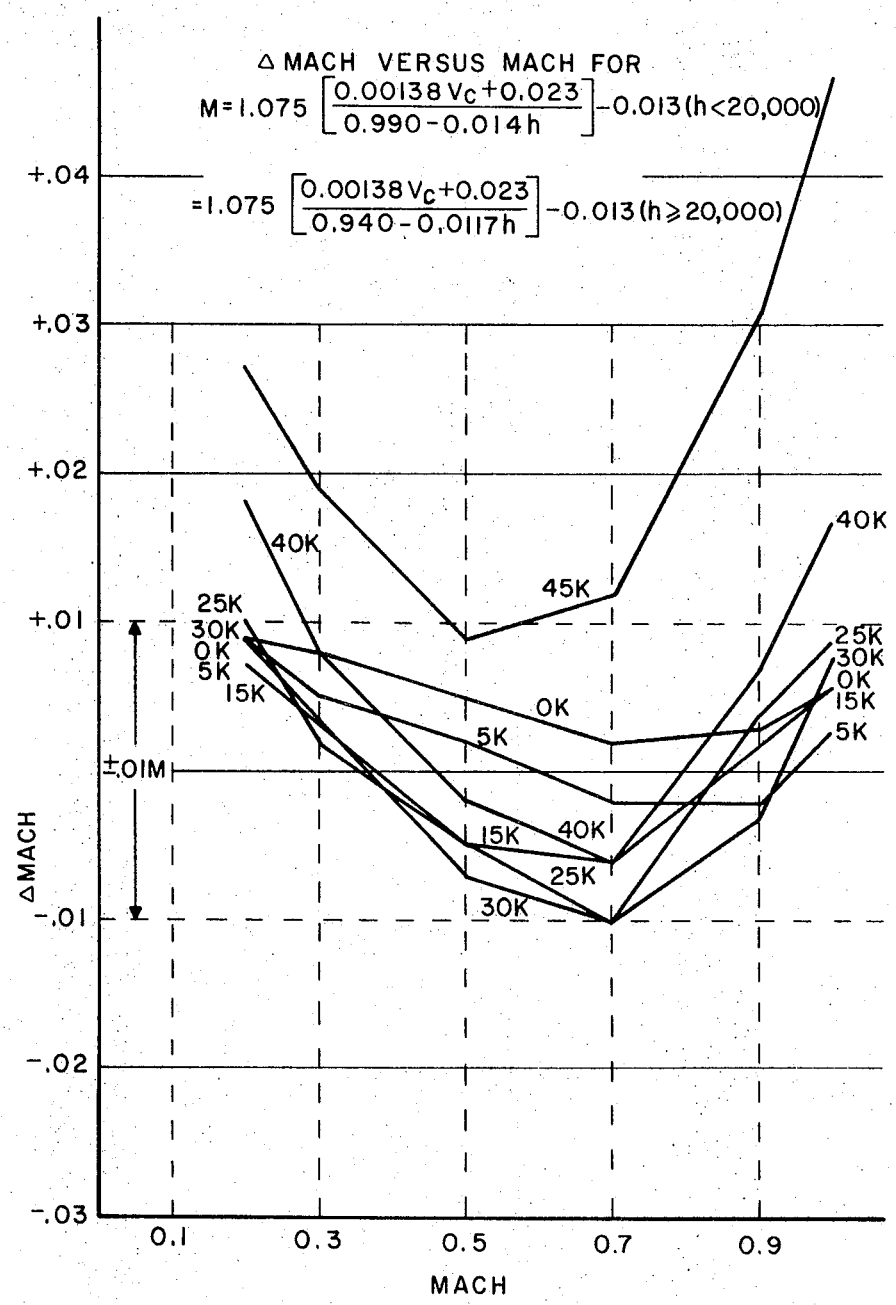
Figure 5:
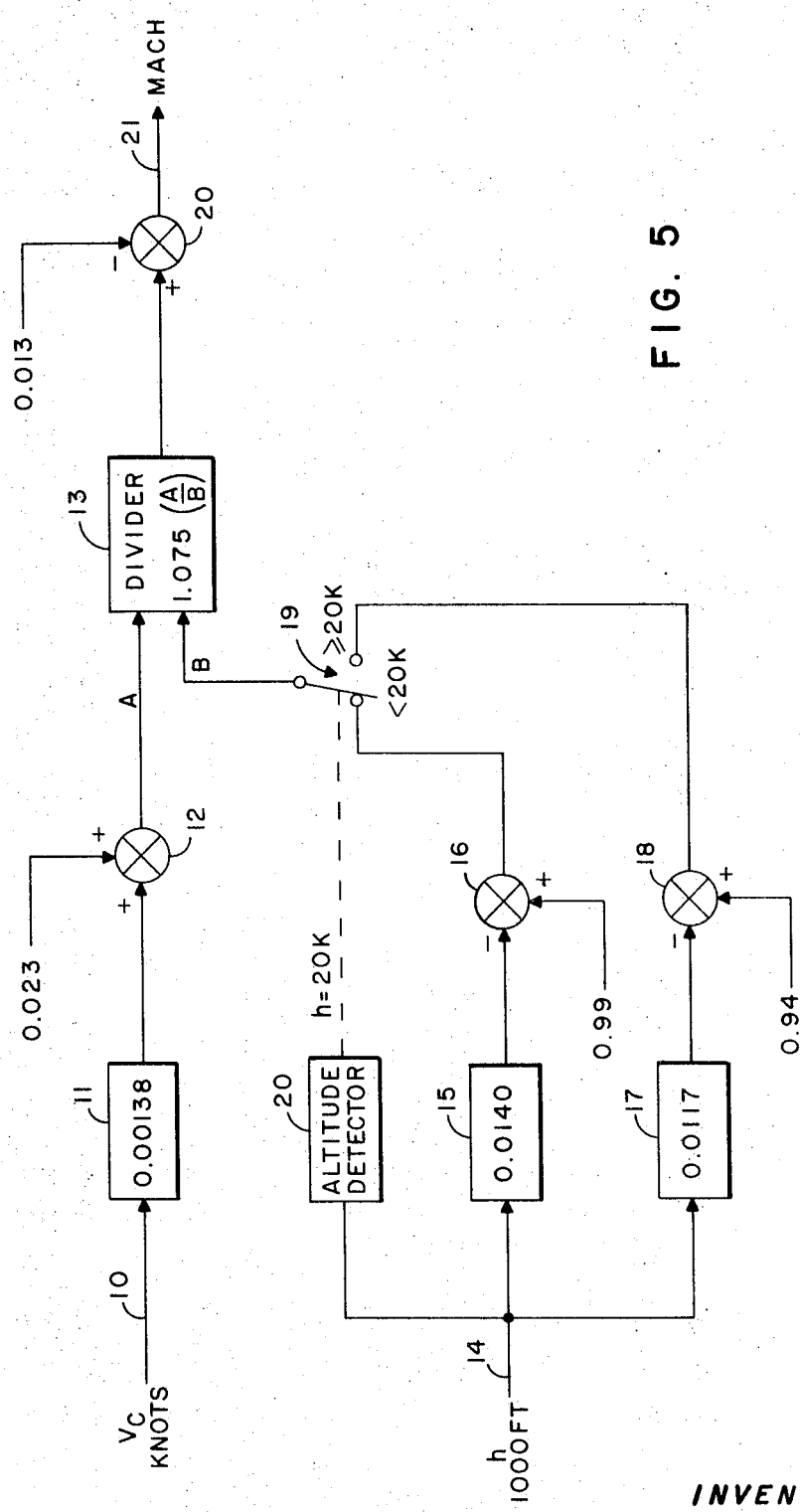

FIG. 4 represents the relationship between actual Mach number and computed Mach number in accordance with an improved relationship between Mach number, calibrated airspeed and barometric altitude as defined by the invention; and FIG. 5 illustrates an electronic implementation for derivation of an output signal proportional to aircraft Mach number by performance of analogue operations on the calibrated airspeed and barometric altitude input parameters.

The present invention is restricted to a computation of Mach number as a function of airspeed and barometric altitude for conditions of subsonic flight, that is, the computation will be for the attainment of Mach number over the range of 0.3 Mach to 0.9 Mach. It is to be realized that for conditions of supersonic flight the calibrated airspeed per se would not be a usable input parameter since it is known that conventional airspeed indicators lose their capability of measuring airspeed under supersonic flight due to compressibility effects and various shock phenomena. Generally speaking the head tube and static pressure tube are incapable of correctly reading the two pressures and the difference in these pressures during supersonic flight is no longer a valid function of airspeed.

Confining the calibration technique to the derivation of Mach under conditions of subsonic flight conditions, as above indicated the actual equation for Mach as a function of barometric altitude $h$ and calibrated airspeed $V_c$ may be derived from consideration of static pressure, impact pressure, calibrated airspeed, air densities and common gas equations to arrive at an extremely involved relationship. Utilizing these relationships an equation of Mach in terms of barometric altitude $h$ and calibrated airspeed $V_c$ may be derived as follows.

A conventional equation for Mach is:

$$M = \left\{ \frac{2}{\gamma-1} \left[ \left(\frac{q_c}{P_s}+1\right)^{\frac{\gamma-1}{\gamma}} - 1 \right] \right\}^{1/2} \quad (1)$$

where $\gamma$=ratio of specific heats =1.4 for air;
$P_s$=static pressure; and
$q_c$=impact pressure.

Equation (1) can then be reduced to:

$$M = \left\{ 5 \left[ \left(\frac{q_c}{P_s}+1\right)^{2/7} - 1 \right] \right\}^{1/2} \quad (2)$$

Calibrated airspeed is commonly expressed as:

$$V_c = \left\{ \frac{2\gamma P_0}{(\gamma-1)\rho_0} \left[ \left(\frac{q_c}{P_0}+1\right)^{\frac{\gamma-1}{\gamma}} - 1 \right] \right\}^{1/2} \quad (3)$$

where $P_0$=static pressure at atmospheric conditions
=2116.2 lb./ft.$^2$; and,
$\rho_0$=density at atmospheric conditions
=0.002377 slugs/ft.$^3$.

By manipulating equation (3) and inserting the appropriate constants, $q_c$ can be expressed as a function of $V_c$.

$q_c = 2116.2[(1.6045 \times 10^{17} V_c^2 + 1)3.5 - 1]$  (4)

An expression for static pressure as a function of altitude will next be derived. The following two common gas equations will serve as a base for the derivation:

$P_s = \rho g_o RT$  (5)
=geopotential equation of state, and
$dP_s = -\rho g_{dh}$  (6)
=geopotential hydrostatic equation where $g_o$=standard gravity
=32.174 ft./sec.$^2$;
$\rho$=density;
R=gas constant
=53.35 ft./°R.; and
T=temperature in degrees Rankine.

Combining equations (5) and (6) yields:
$dP_s/P_s = -dh/RT$

Making a third assumption that temperature varies linearly with altitude, T as a function of $h$ is:
$T = T_o - ah$
where $T_o$ =standard sea level temperature (8)
=518.69° R.; and
$a$=standard lapse rate
=0.00357°F./foot.

Combining equations (7) and (8) and adding definite integral symbols results in the expression:

$$\int_{P_0}^{P_s} \frac{dP_s}{P_s} = \int_0^h \frac{-dh}{(T_0 - ah)} \quad (9)$$

Continuing the integration and substituting known quantities, the following results:

$P_s = 2116.2[1 - 6.875 \times 10^1 h]5.25$ (10)

Equation (10) is applicable from sea level up to 36,089 feet as the linear lapse rate is valid over this range.

Above 36,089 feet, another equation for $P_s$ must be derived. Equation (7) is also used for derivation of this equation. As T is considered constant above 36,089 feet, the following definite integral relationship will result:

$$\int_{P_1}^{P_s} \frac{dP_s}{P_s} = \frac{-1}{RT_1} \int_{h_1}^{h} dh \qquad (11)$$

where $P_1$=standard static pressure at 36.089 feet
=472.68 lb./ft.$^2$;

$T_1$=$_{standard\ temperature\ at}$ 36,089 feet
=389.99 degrees Rankine; and $h_1$ =36,089 feet.

Continuing the integration of equation (11) and substituting known quantities results in the equation:

$$P_s = 472.68 e^{-\frac{h-36,089}{20806}} \qquad (12)$$

Now to obtain the complete equation of Mach in terms of $h$ and $V_c$, equations (2), (4), (10), and (12) are combined. The following result:
0001

$$M = \left\{ 5 \left[ \left( \frac{(1.6045 \times 10^{-7} Vc^2 + 1)^{3.5} - 1}{(1 - 6.875 \times 10^{-6} h)^{5.25}} + 1 \right)^{2/7} - 1 \right] \right\}^{1/2} \qquad (13)$$

= expression to use for $h \leq 36,089$ feet; and $$M = \left\{ 5 \left[ \left( \frac{(1.6045 \times 10^{-7} Vc^2 + 1)^{3.5} - 1}{0.2238 e^{-\frac{h-36,089}{20805}}} + 1 \right)^{2/7} - 1 \right] \right\}^{1/2} \qquad (14)$$

= expression to use for $h \geq 36,089$ feet.

It is seen that the above expressions (13) and (14) are complex, and electronic computation of Mach in accordance with the above expression would be quite difficult. The above expression it is realized is a nonlinear relationship.

This invention is based on the application of selected linear techniques for computing Mach from altitude and calibrated airspeed sensor data wherein simple straight line functions and an ordinary dividing line operation may be utilized to approximate Mach to within plus or minus 0.01 Mach over a range of 0.3 to 0.9 Mach and 0 to 40,000 feet altitude.

A means of approximating the complex nonlinear relationship between Mach number, calibrated airspeed, and barometric altitude may be developed by first considering an empirical relationship between Mach and the ratio $q_c/P_s$ to be:
M=1.04$[q_c/P_s]^{0.44}$ (15)

The validity of the approximation of expression (15) may be depicted by tabular comparison between actual Mach and approximated Mach versus $q_c/P_s$ values. It may be shown that the worst case Mach errors from the approximation expression (15) can be as high 0.017 Mach. Assuming that expression (15) would be used for a Mach computation, and realizing that impact pressure $q_c$ and static pressure $p_s$ would still be computed from calibrated airspeed $V_c$ and barometric altitude $h$, respectively, it is suggested that Mach computation errors in excess of 0.017 Mach would result. It can be shown, however, that the errors can be made self-compensating to the extent that somewhat less than 0.017 Mach error can be realized over a wide Mach range when Mach is computed from $V_c$ and $h$. Expression (15) can be rewritten in the form:

$$M = 1.04 \frac{\left[\frac{q_c}{P_o}\right]^{0.44}}{\left[\frac{P_s}{P_o}\right]^{0.44}} \qquad (16)$$

In expression (16) $q_c$ and $P_s$ are normalized with standard atmospheric pressure $P_o$. Upon considering the numerator and the denominator terms of expression (16) an interesting phenomenon is observed. If the expression $[q_c/P_o]^{0.44}$ is plotted versus calibrated airspeed $V_c$, a nearly straight line function is observed as depicted in FIG. 1.

Figure 1:
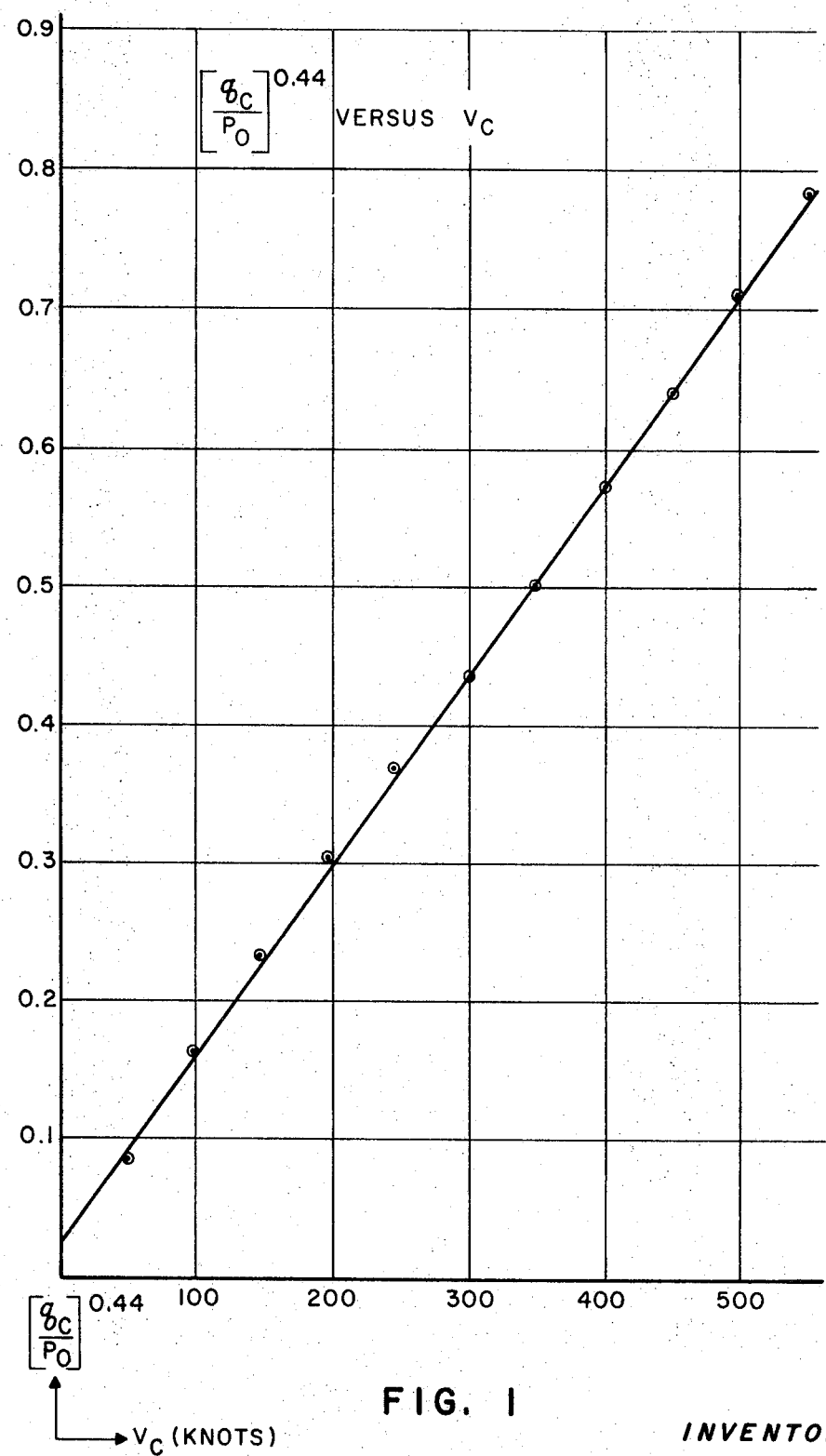
FIG. 1 is a plot of normalized impact pressure as a function of calibrated airspeed from an empirical relationship in accordance with the present invention.

The plot of FIG. 1 is derived from drawing the straight line approximation made through the points the curve should follow. From the straight line approximation of FIG. 1 the equation of the straight line approximation may be determined numerically in terms of the slope and axis intercept as: $[q_c/P_o]^{0.44}$
=0.00138$VBHc$+0.023 ($V_c$ in knots) (17)

Figure 2:
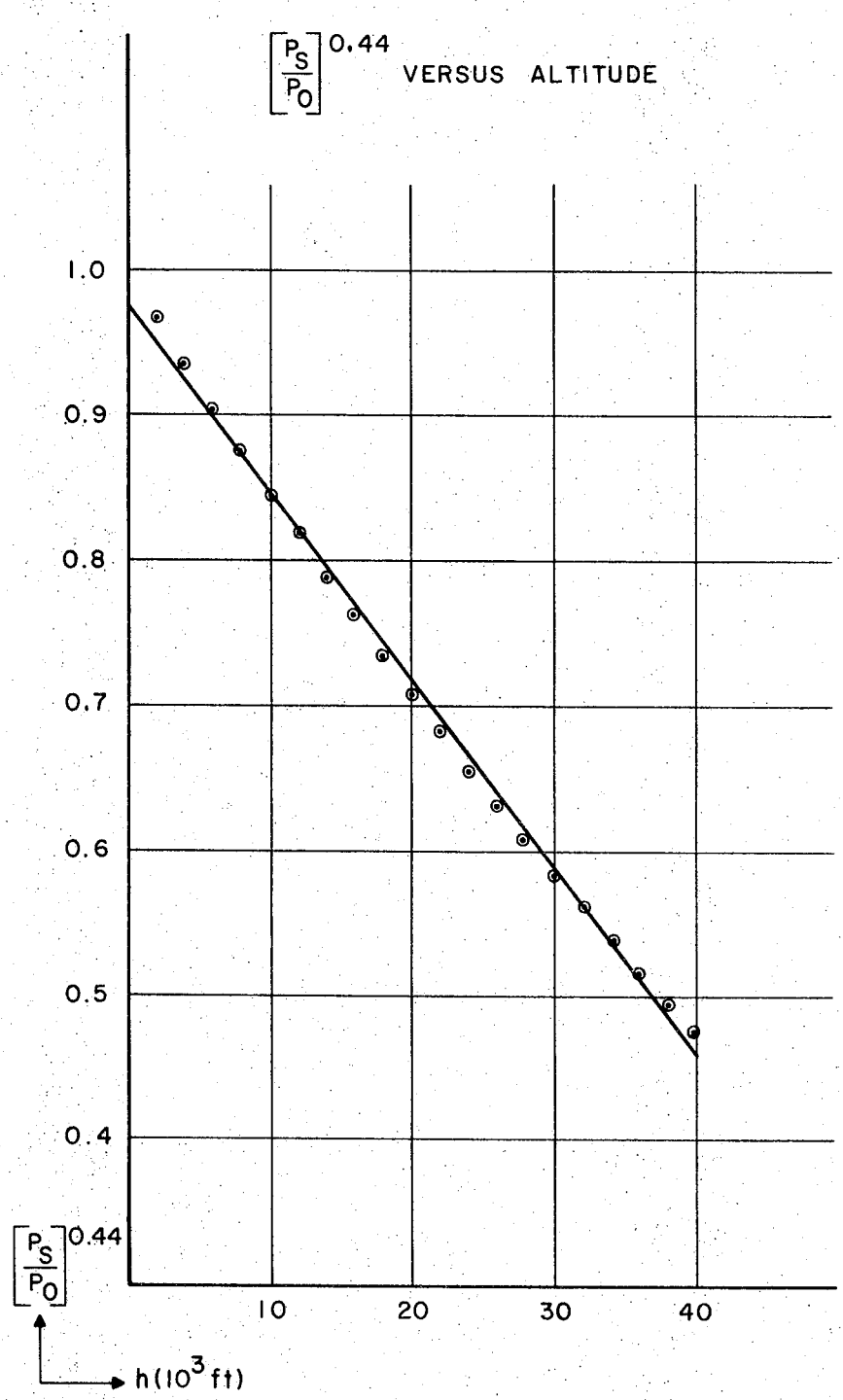
FIG. 2 is a plot of normalized static pressure as a function of barometric altitude in accordance with a normalized empirical relationship as defined by this invention.

Now the expression $[P_s/P_o]^{0.44}$ of expression (16) may be plotted versus barometric altitude $h$ as depicted in FIG. 2, and again a nearly straight line relationship is realized. FIG. 2 depicts the actual points the curve should follow and a straight line approximation of the function. The equation of the straight line of FIG. 2 may then be determined numerically in terms of slope and axis intercept as:
$[P_s/P_o]^{0.44}$=0.978−0.013$h$ ($h$ in 10$^3$ ft.) (18)

By substitution of these equations of the straight line approximations as defined in expressions (17) and (18) in expression (16), the following relationship is seen:

$$M = 1.04 \left[ \frac{0.00138 Vc + 0.023}{0.978 - 0.013h} \right] \qquad (19)$$

The considerations of the approximate expression for Mach in terms of worst case errors may, by application of simple linear techniques, arrive at an improvement in the Mach approximation as:

$$M = 1.085 \left[ \frac{0.00138 Vc + 0.023}{0.978 - 0.013h} \right] - 0.016 \qquad (20)$$

Figure 3:
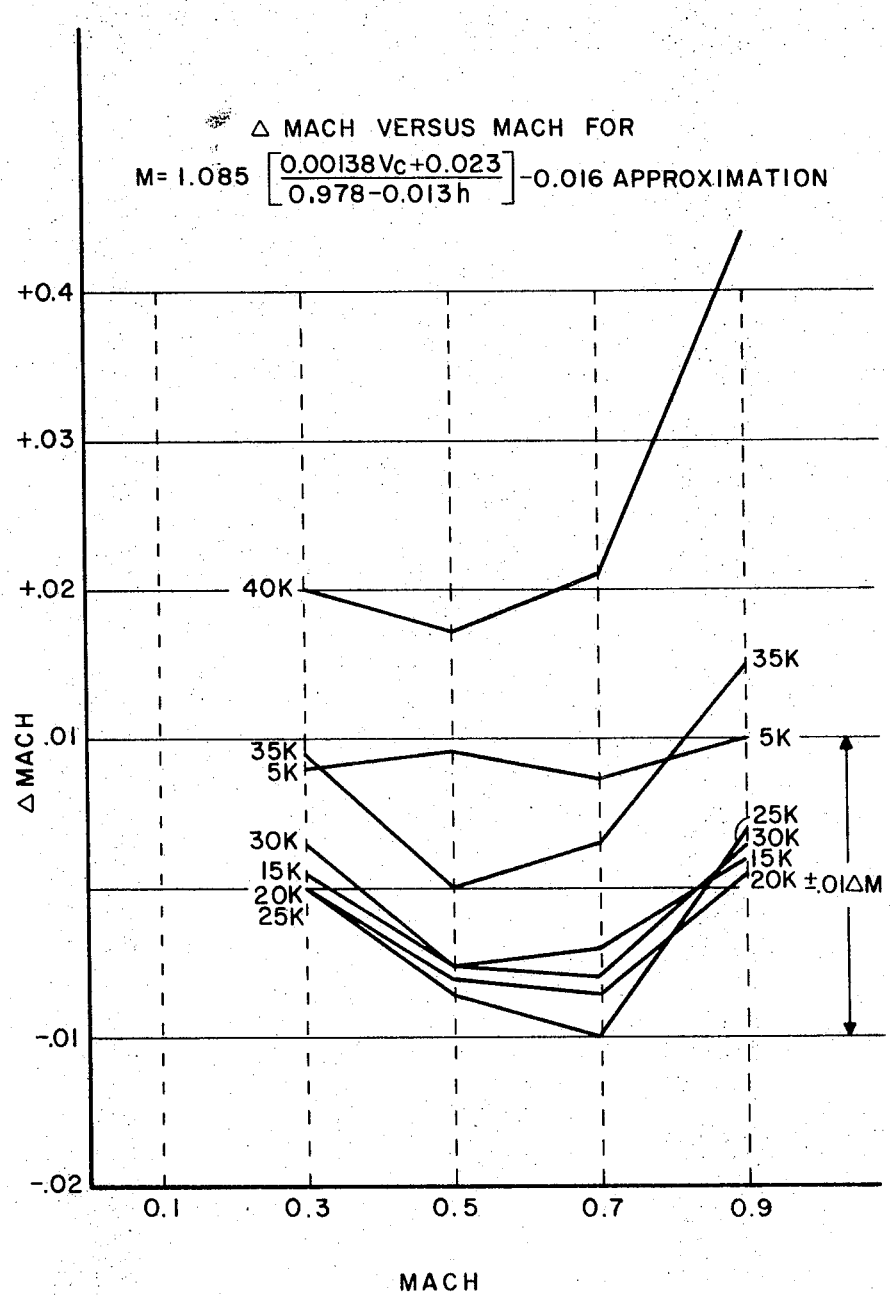
FIG. 3 represents the relationship between actual Mach number and computed Mach number in accordance with a first relationship between Mach number, calibrated airspeed and barometric altitude as defined by the invention.

Consideration of graphical results concerning the validity of expression (20) is depicted in FIG. 3 wherein it is observed that expression (20) approximates Mach to within 0.01 Mach from 0.3 to 0.9 Mach and between approximately 5,000 and 30,000 feet altitude. However, at 40,000 feet altitude Mach errors between 0.02 and 0.044 are observed from 0.3 to 0.9 Mach.

Since flight altitudes between 30,000 and 40,000 feet are common, it would be desirable to reduce the Mach error which expression (20) allows in this altitude range and thus a refinement of expression (20) would be desirable. One possible refinement, as determined by simple linear techniques, would result in the two following expressions:

$$M = 1.075 \left[ \frac{0.00138 Vc + 0.023}{0.990 - 0.014h} \right] - 0.013 \qquad (21)$$

for $h < 20,000$ feet; and $$M = 1.075 \left[ \frac{0.00138 Vc + 0.023}{0.940 - 0.0117h} \right] - 0.013 \qquad (22)$$

for $h \geq 20,000$ feet.

From expressions (21) and (22) it is observed that a linear change in the $[P_s/P_o]^{0.44}$ versus altitude relationship occurs at 20,000 feet altitude. Expressions (21) and (22) approximate Mach to within ±0.01 over a range of 0.3 to 0.9 Mach and 0 to 40,000 feet altitude. (See FIG. 4.)

The consideration of the expressions (21) and (22) for the two altitude ranges indicates that each is a simple linear relationship involving a constant multiplied by the quotient of two straight line functions, with a constant being subtracted. This relationship may be quite simply implemented electronically as indicated in FIG. 5. With reference to FIG. 5, the first input parameter $V_c$ is supplied on line 10 to an operational amplifier 11 which functions to multiply the $V_c$ term by 0.00138 for application as a first input to a mixer 12 the second input to which is the form of a biassing constant equivalent to 0.023. The output from mixer 12 is applied to the first input A to an operational divider 13.

The second input parameter $h$ is applied on line 14 to a further operational amplifier 15 which multiplies the $h$ parameter by a factor 0.0140 and applies a first input to a further mixer 16. A second input to mixer 16 is in the form of a further biassing constant, equivalent to 0.99. The inputs to mixer 16 are applied in a subtractive sense and the output from mixer 16 is applied to a first pole of a single-pole double-throw switch 19.

The altitude input parameter $h$ on line 14 is additionally applied to a further operational amplifier 17 to multiply the input parameter $h$ by a factor 0.0117 and supply a first input to a still further mixer 18. The second input to mixer 18 is the form of a further biassing constant equivalent to 0.94. The inputs to mixer 18 are applied in a subtractive sense and the output from mixer 18 is applied to the second pole of switch 19. The wiper arm of switch 19 is positioned in accordance with a threshold-sensitive altitude detector 20 which also receives the input parameter $h$. Detector 20 positions switch 19 to the left position illustrated for $h$ inputs in the range below 20,000 feet and to the right-hand position for $h$ inputs in the range exceeding 20,000 feet. The wiper arm of switch 19 is applied as a second input B to divider 13. Divider 13 functions to multiply the quotient of the inputs A and B by a factor of 1.075 and supply a first input to an output mixer 20. A second input to the output mixer 20 is a final biassing constant equivalent to 0.013, and the output 21 from mixer 20 corresponds to the calibrated Mach signal in accordance with the present invention.

I claim:

1. A method of electronically generating a signal proportional to Mach number from input parameters of calibrated airspeed and barometric altitude comprising the steps of:
considering an empirical relationship between Mach number and the ratio of impact pressure $q_c$ and static pressure $P_o$ as $M=k[q_c/P_s]^{0.44}$,
normalizing the terms $q_c$ and $P_s$ with standard atmospheric pressure $P_o$ in the above relationship and reexpressing the empirical relationship as $$M = k \frac{\left[\frac{q_c}{P_0}\right]^{0.44}}{\left[\frac{P_s}{P_0}\right]^{0.44}},$$

plotting the term $[q_c/P_o]^{0.44}$ as a function of calibrated airspeed $V_c$,
deriving by linear technique the equation of the straight line approximation drawn through the calculated points of $V_c$ versus $[q_c/P_o]^{0.44}$,
plotting the term $[P_s/P_o]^{0.44}$ as a function of barometric altitude $h$,
deriving by linear techniques the equation of the straight line approximation drawn through the calculated points of $h$ versus $[P_s/P_o]^{0.44}$,
deriving by electronic analogue computation a signal proportional to Mach number as a function of the constant $k$ multiplied by the quotient of a first signal proportional to said first, straight line approximation as computed from said $V_c$-input parameter divided by a second signal proportional to said second straight line approximation as computed from said $h$-input parameter.

2. A method as defined in claim 1 wherein said analogue computation is based on the relationship $$M = 1.04 \left[\frac{0.00138 V_c + 0.023}{0.978 - 0.013h}\right].$$

3. A method as defined in claim 1 further comprising application of linear techniques to subtract from the computation a further predetermined constant.

4. A method as defined in claim 2 wherein said analogue computation is based on the relationship $$M = 1.085 \left[\frac{0.00138 V_c + 0.023}{0.978 - 0.013h}\right] - 0.016.$$

5. A method as defined in claim 2 wherein said analogue computation is based on the relationship $$M = 1.075 \left[\frac{0.00138 V_c + 0.023}{0.990 - 0.0140h}\right] - 0.013$$

for barometric altitude input parameters less than 20,000 feet and upon the relationship $$M = 1.075 \left[\frac{0.00138 V_c + 0.023}{0.940 - 0.0117h}\right] - 0.013$$

for barometric altitude input parameters in excess of 20,000 feet, said analogue computation including the step of developing signals proportional to the denominator expressions of each of said above defined relationships and selectively including in the computations one of said denominator terms in accordance with the range of input parameter $h$.

6. A method as defined in claim 3 wherein said analogue computation is based on the relationship $$M = k \left[\frac{0.00138 V_c + 0.023}{a - bh}\right] \pm -c$$

where $k$ is an integer between the limits of 1.04 and 1.085, $a$ is an integer between 0.940 and 0.990, $b$ is an integer between the limits of 0.0117 and 0.0140, and $c$ is an integer between the limits of 0.013 and 0.016.

7. A method of developing an analogue electronic signal proportional to Mach number from linear computations of expressions involving variable input parameters calibrated airspeed $V_c$ and barometric altitude $k$ comprising;
plotting the numerator and denominator of the quotient factor in the empirical relationship $$M = k \frac{\left[\frac{q_c}{P_0}\right]^{0.44}}{\left[\frac{P_s}{P_0}\right]^{0.44}}$$

as respective functions of airspeed $V_c$ and barometric altitude $h$, determining by straight line approximation the expressions for $[q_c/P_o]^{0.44}$ and $[P_s/P_o]^{0.44}$ as respective functions of $V_c$ and $h$, substituting the approximate straight line expressions in the above empirical relationship to arrive at a linear expression $$M = k \left[\frac{mV_c + a}{b - nh}\right]$$

where $a$, $m$, $b$, and $n$ are constants determined by the above defined straight line approximations, computing from said input parameters $V_c$ and $h$ first and second signals proportional to solutions of the expressions $(mV_c+a)$ and $(b-nh)$ respectively, dividing said first signal by said second, and multiplying the last defined quotient by the constant $k$.

8. A method as defined in claim 7 including developing signals proportional to plural straight line approximations of the expression $(b-nh)$ over predetermined successive ranges of altitude $h$, developing by analogue computation signals proportional to each of said plural expressions, and selectively including in the computations a predetermined one of said plural signals in accordance with the range of said input parameter $h$.

9. A method as defined in claim 8 including modification of the expression $$M = k \left[\frac{mV_c + a}{b - nh}\right]$$

by subtracting therefrom a further constant $c$.

10. A method and means as defined in claim 7 including modification of the expression $$M = k\left[\frac{mV_c + a}{b - nh}\right]$$

by subtracting therefrom a further constant $c$.

11. A method and means as defined in claim 10 wherein $k$ is selected as an integer between 1.04 and 1.085, $m$ as 0.00138, $a$ as 0.023, $b$ as an integer between 0.940 and 0.990, $n$ as an integer between 0.0117 and 0.014, and $c$ as an integer between 0.013 and 0.016.

* * * * *

UNITED STATES PATENT OFFICE
CERTIFICATE OF CORRECTION

Patent No. 3,617,721          Dated November 2, 1971

Inventor(s) Jimmie L. Foster

It is certified that error appears in the above-identified patent and that said Letters Patent are hereby corrected as shown below:

Column 2, line 58, at the end of the equation insert --(7)--; line 75, delete the entire line and substitute therefor $$--P_s = 2116.2 \left[1-6.875 \times 10^{-6}h\right]^{5.25} \qquad (10)--;$$

Column 3, above equation (13), delete "0001"; Column 4, line 12, delete the entire line and substitute therefor $$-- = 0.00138V_c + 0.023 \quad (V_c \text{ in knots}) \qquad (17)--;$$

Column 5, line 37, after "pressure" delete "$9_c$" and substitute therefor --$q_c$--. Claim 2 should be identified as claim 3. Claim 3 should be identified as claim 2. Claim 6, line 1, reference should be made to claim 2 rather than claim 3; delete the entire expression in the claim and substitute therefor $$-- M = k \left[\frac{0.00138 V_c + 0.023}{a - b h}\right] - c --.$$

Signed and sealed this 18th day of April 1972.

(SEAL)
Attest:

EDWARD M. FLETCHER, JR.
Attesting Officer

ROBERT GOTTSCHALK
Commissioner of Patents